Figure 1:
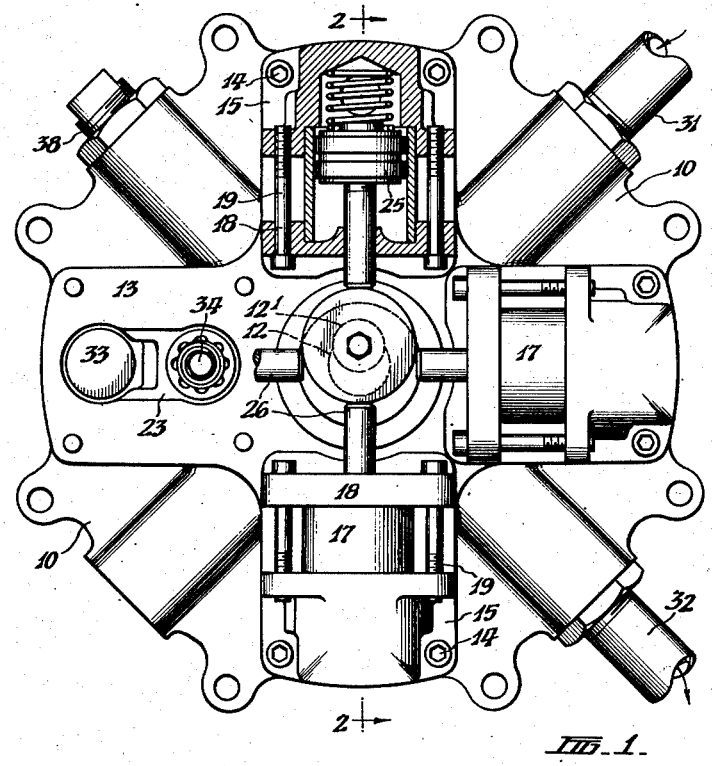

Aug. 6, 1957 — R. P. SEWELL — 2,801,596
MULTI-CYLINDER PUMP
Filed March 31, 1954 — 4 Sheets-Sheet 1

INVENTOR
RONALD P. SEWELL
By: Young, Emery & Thompson
Attys.

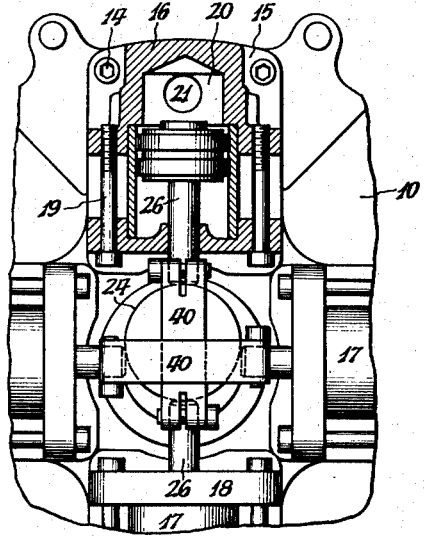
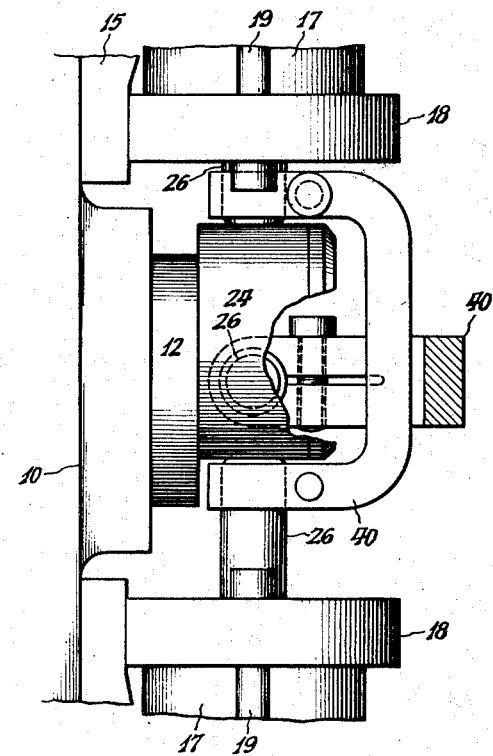

Aug. 6, 1957    R. P. SEWELL    2,801,596
MULTI-CYLINDER PUMP
Filed March 31, 1954    4 Sheets-Sheet 4

INVENTOR
RONALD PERCIVAL
       SEWELL
By Young, Emery & Thompson
            Attys

United States Patent Office 2,801,596
Patented Aug. 6, 1957

2,801,596

MULTI-CYLINDER PUMP

Ronald Percival Sewell, Ballan, Victoria, Australia

Application March 31, 1954, Serial No. 420,095

Claims priority, application Australia April 2, 1953

5 Claims. (Cl. 103—174)

This invention relates to multi-cylinder pumps and particularly to high speed pumps adapted to be driven by the power take-off shaft of a tractor and which are suitable among other things for delivering agricultural and horticultural treatment liquids to spray heads or jets.

Piston pumps usually have a comparatively long stroke and are adapted to be driven at a comparatively low speed so that it is necessary to interpose reduction gearing when such a pump is mounted on, and driven by the power take-off shaft of, a tractor. Such long stroke, low speed pumps also require to be fitted with an air chamber to maintain a sufficiently constant delivery pressure and thus the pump and gearing are generally too large in size to be conveniently mounted on tractors of the sizes most commonly used for farming and other like purposes.

Moreover, such known pumps usually incorporate valves which do not operate satisfactorily unless the pump is mounted in a particular attitude which is not always convenient.

Now the general object of this invention is to provide improvements in pumps, particularly pumps for agricultural and horticultural spraying whereby the aforesaid disadvantages are overcome or minimised.

Accordingly, the invention includes a pump comprising a plurality of cylinders arranged radially around a rotatable driving shaft, each cylinder being provided with a reciprocable piston, valve controlled inlet and delivery passages individual to each cylinder and a channel extending around and spaced from the driving shaft and communicating either with the said inlet passages or the said delivery passages.

Preferably two concentric channels are provided, namely a common inlet channel and a common delivery channel.

A feature of the invention in its preferred form resides in forming the cylinders separately from each other and in attaching them individually to one side of a common support having the said common inlet and outlet channels in the opposite side thereof, the said common support also incorporating a bearing for the driving shaft.

Another feature of the invention resides in so arranging the said inlet and outlet passages that they have a common partition wall and in arranging a relief valve therein so that when this valve is open, the pumped liquid may pass directly from the outlet channel to the inlet channel.

Figure 3:
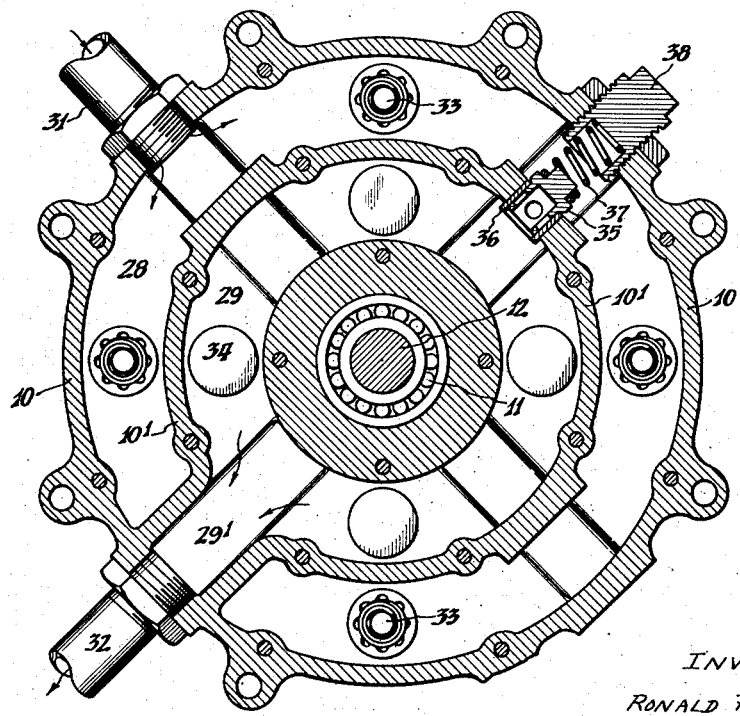
Figure 2:
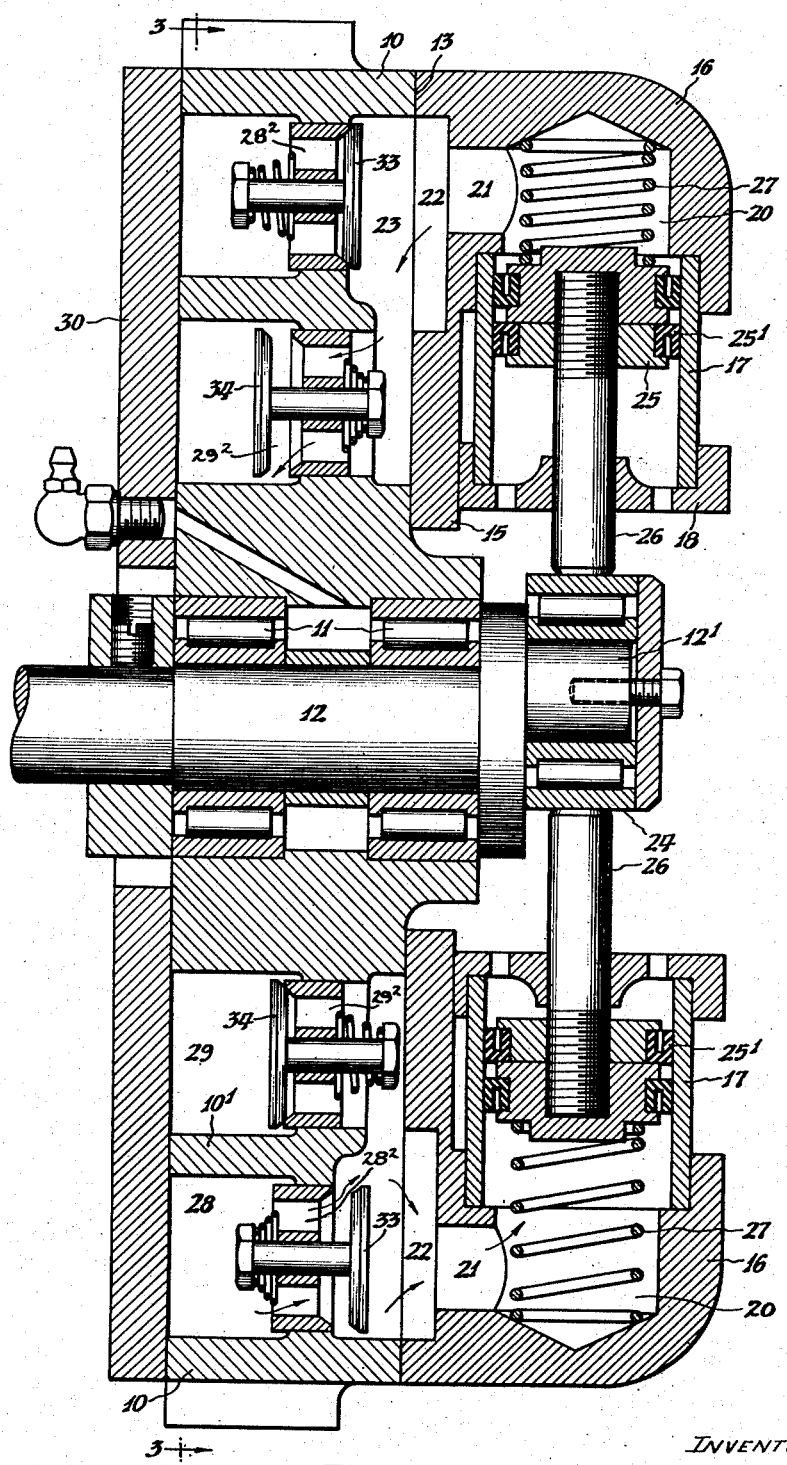
Figure 6:
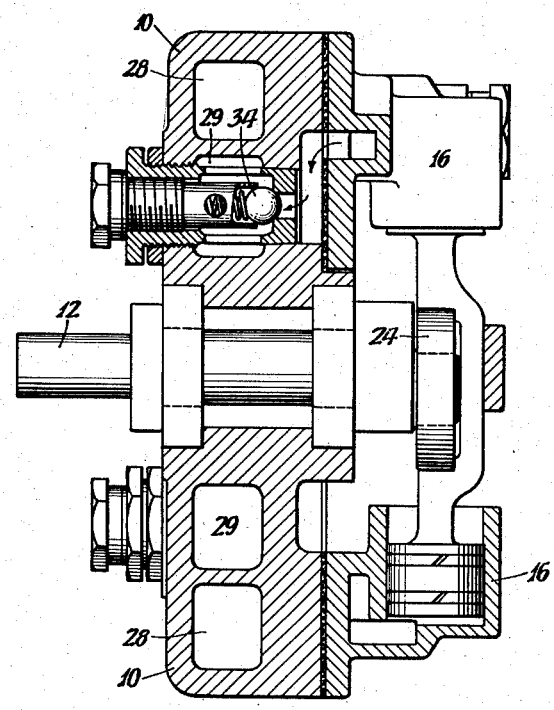
Figure 7:
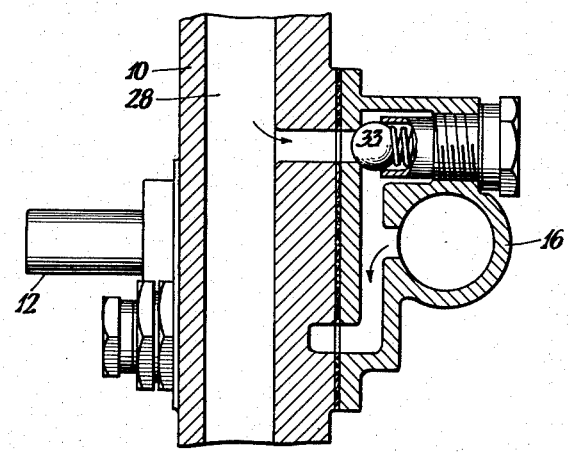

In the drawings which show preferred forms of the invention:

Figure 1 is a view in elevation, partly in section of a multi-cylinder pump,

Figure 2 is a view in sectional side elevation taken on the line 2—2 of Figure 1 and is drawn to a larger scale, Figure 3 is a view in sectional elevation taken on the line 3—3 of Figure 2, Figure 4 is a view in elevation of a portion of a pump and shows a modification, Figure 5 is a view in side elevation of a portion of the apparatus shown in Figure 4, Figure 6 is a sectional view similar to Figure 2 and shows a further modification, and Figure 7 is a view in sectional plan taken on the line 7—7 of Figure 6.

The pump shown in Figures 1, 2 and 3 of the drawings comprises a main body member 10 of flat ended cylindrical form provided centrally with antifriction bearings 11 for an axially disposed rotatable driving shaft 12 one end (not shown) of which is adapted to be coupled to a power shaft e. g. the power take-off shaft of a tractor. The opposite end of the shaft 12 is formed with a crank pin $12^1$ having a short throw and an anti-friction race 24 is mounted thereon.

The body member 10 is formed as a casting and is provided on one side thereof with a plurality of equally spaced radially arranged seatings 13 to each of which is detachably secured, by screws 14, the foot plate 15 of a corresponding radially arranged cylinder head 16. The illustrated pump is provided with four equally spaced cylinder heads 16 although the invention is not limited thereto.

Each cylinder head is recessed at its inner end to receive the outer end of a corresponding cylinder barrel 17 having its inner end similarly received within a recess in an individual end cover 18 slidably mounted on the respective seating 13 and connected to the cylinder head by a diametrically opposed pair of clamping screws 19. Each cylinder head is formed with a cavity 20 disposed coaxially with and constituting an extension of the interior of the cylinder and this cavity communicates by a lateral passage 21 with a recess 22 in the respective foot plate 15, such recess being disposed in register with the outer end portion of a radial recess 23 formed within the seating 13.

Each cylinder 17 is fitted with a piston 25 provided with sealing rings $25^1$ and secured to the outer end of a radially disposed piston rod 26 which extends through a clearance hole in the cover 18 at the inner end of the cylinder and the inner end of the piston rod is maintained in contact with the outer ring of the antifriction race 24 on the crank pin $12^1$ by means of a coiled compression spring 27 located within the cylinder head 16 and abutting against the outer end of the piston.

Thus when the shaft 12 is rotated the pistons of the several cylinders, which are single-acting, are reciprocated in the phase relationship determined by their angular spacings, the outward movements of each piston being positively effected by the crank pin $12^1$ while the return movements are effected by the respective spring 27.

In order that the shaft 12 may be directly coupled to the tractor power take-off shaft the inertia of the reciprocating parts is kept low by providing the crank with a short throw and by the use of pistons and piston rods of sufficiently low weight.

That side of the main body member 10 which is remote from the cylinders is formed with two concentric channels 28 and 29 of relatively large cross-sectional area which are separated by a partition wall $10^1$, the open outer sides of the channels being normally closed by an annular cover plate 30 which is detachably secured to the said body member.

The outer channel 28 serves as a common inlet passage for the liquid to be pumped, while the inner channel 29 similarly serves as a common delivery passage, the outer channel being preferably disposed approximately in alignment with the aforesaid lateral passages 21 in the several cylinder heads as shown. For this purpose a radially disposed inlet pipe 31, located centrally between two of the cylinders communicates at its inner end with the outer channel 28 while a similarly arranged and correspondingly located delivery pipe 32 communicates with the inner channel 29 for which purpose that channel is formed with an outward radial extension 29¹ the wall of which interrupts the outer channel 28 as shown in Figure 3.

The aforesaid radial recess 23 in each of the cylinder seatings 13 communicates with the common inlet channel 28 by a lateral inlet passage 28² which is individual to the respective cylinder and is normally closed by a spring-loaded inlet poppet valve 33 while similarly each of the said recesses communicates with the common delivery channel 29 by a lateral delivery passage 29² which is individual to the respective cylinder and is normally closed by a similar delivery valve 34. Each of these valves is mounted in a corresponding bush which is pressed into the corresponding aperture in the body 10 so that the several valve units may be pre-assembled.

In order to avoid excessive pressures, a relief valve 35 is provided to permit liquid to pass direct from the common delivery channel 29 to the common inlet channel 28 when the delivery pressure reaches a predetermined maximum value. For this purpose, the partition wall 10¹ between the said channels is formed with a radial by-pass passage in which is mounted a bush 36 having a seating in its outer end for the valve 35 which is located in the inlet channel 28 and is guided by an inward sleeve extension which is slidably mounted in the bush and is formed in its wall with openings for the passage of liquid. The valve 35 is normally maintained in contact with its seating by means of a radially arranged spring 37 also located within the inlet channel 28 and having its outer end abutting against a screw-threaded plug 38 fitted to the outer wall of the channel and which projects radially therefrom, whereby it may readily be adjusted to regulate the spring pressure. It will be evident also that the valve 35 is readily removable for inspection or replacement.

A pump as above described and having cylinders of about 1½ inches internal diameter and a stroke of about ⅝ of an inch may have an outside diameter as low as 10 or 11 inches and thus is of a size which is convenient for mounting on a farm tractor or the like, particularly as the driving shaft thereof may be directly coupled to the power take-off shaft of the tractor so that the reduction gearing usually required is eliminated. Likewise, due to the provision of a plurality of cylinders the pistons of which operate successively at high speed through a small stroke only, the delivery is sufficiently constant in pressure and volume to permit of the elimination of the usual air vessel and it has been found that a sufficiently high pressure is maintained even at normal idling speeds of the tractor engine.

It will likewise be evident that the short stroke of the pistons reduces inertia forces and permits of high speed operation thereof without excessive wear or noisy operation, the pump being particularly suitable for delivering low or medium volumes of liquid at moderate pressures as required, for example, for hormone spraying and for other horticultural, agricultural and market gardening operations.

Also the inlet and delivery valves operate efficiently at relatively high speeds irrespecitve of their attitudes while the internally located relief valve 35 prevents damage to the mechanism by providing a direct by-pass from the common delivery channel to the common inlet channel.

The pump moreover, is simple and convenient to manufacture, assemble and service and is adapted to be quickly and conveniently attached to or detached from the tractor as required.

In the somewhat modified construction shown in Figures 4 and 5 the inner ends of each opposed pair of piston rods 26 are connected together by a corresponding U-shaped yoke member 40 which extends across the outer end of the crank pin, one yoke being arranged to extend between the arms of the other and each end of each yoke being formed with a split sleeve adapted to be clamped about the respective piston rod. Thus when this construction is employed the pistons are positively moved inwardly as well as outwardly by the rotating crank pin 12¹ for which reason, the piston springs 27 shown in Figures 1 and 2 are omitted.

It will be evident that if desired the crank pin 12¹ may be replaced by an eccentric or cam.

In lieu of forming the channels 28 and 29 as previously described and as shown in Figure 2, they may be located wholly within the body 10 as shown in Figure 6 in which case the inlet and delivery valves are preferably incorporated in sub-assemblies which are removably mounted in the adjacent end of the body. Thus Figure 6 also shows a delivery valve 34 arranged in this manner. Alternatively one at least of each pair of inlet and delivery valves may be mounted in the respective cylinder as shown in Figures 6 and 7 wherein the inlet valve 33 is so arranged whereby it is more readily accessible for replacement.

I claim:

1. A pump comprising a body, a driving shaft rotatively mounted in the body and projecting from each side thereof, piston driving means on the shaft at one side of the body, a plurality of cylinders detachably secured to the last mentioned side of the body and arranged radially about the shaft at equal angular spacings, a reciprocable piston in each cylinder, an inwardly extending piston rod on each piston, operatively engaging the said piston driving means, the body being formed in that side thereof which is remote from the cylinders with a common inlet channel and a common delivery channel disposed substantially concentrically about the shaft and one inwardly of the other, cover means attached to the body and closing the said channels, the said body being formed with a plurality of inlet passages, one for each cylinder, each inlet passage extending through the body from the common inlet channel and communicating at its opposite end with the outer end of the respective cylinder, a spring-loaded inlet valve in each of the said inlet passages, the said body being similarly formed with a plurality of delivery passages each communicating at one end with the common delivery channel and at the other end with the respective cylinder and a spring-loaded delivery valve in each of the said delivery passages.

2. A pump comprising a body, a rotatable driving shaft extending through the body, piston driving means on one end of the shaft, a plurality of individual cylinder units arranged radially around the shaft at equal angular spacings, means detachably securing the cylinders to one side of the body about the said piston driving means, a piston in each of the cylinders, an inwardly extending piston rod on each piston for engagement with the said piston driving means, the opposite side of the body being formed with a common inlet channel and a common delivery channel, such channels being disposed substantially concentrically about the shaft and arranged one inwardly of and close to the other whereby they are separated by an intervening partition wall integral with the body, cover means attached to the body and closing the said channels therein, the said body being formed with a plurality of inlet passages, one for each cylinder unit, each inlet passage communicating at one end with the common inlet channel, an inlet valve in each of said inlet passages, the body being also formed with a plurality of delivery passages, one for each cylinder unit, which similarly communicate at one end with the common delivery channel and a delivery valve in each of the said delivery passages, the ends of the said inlet and delivery passages being connected by a lateral passage in the latter to the interior of the outer end of the respective cylinder.

3. A pump comprising a body, a rotatable driving shaft extending centrally through and journalled in the body, an eccentric driving means on one projecting end of the shaft, a plurality of substantially radial cylinders detachably secured and projecting laterally from the respective end of the body and arranged at substantially equal angular spacings about the said eccentric driving means, a reciprocable impeller member in each cylinder, an impeller actuating means extending inwardly from each impeller member for operative engagement with the eccentric driving means, the body having two channels formed therewithin and disposed at one side of the several cylinders, the said channels being disposed substantially concentrically about the shaft and one inwardly of, and in substantially the same transverse plane as, the other channel, the said inner channel being spaced from the inner periphery of the body whereby liquid cannot pass inwardly therefrom into contact with the shaft, one of the said channels being a common inlet channel which communicates with a common supply passage in the body, the other channel being a common delivery channel which communicates with a common discharge passage in the body, the outer end portion of each cylinder being connected through an individual laterally extending inlet passage to the common inlet channel and being connected through an individual laterally extending delivery passage to the common delivery channel, an inlet valve in each inlet passage and a delivery valve in each delivery passage, the body being formed with a substantially radially disposed by-pass passage extending between and connecting the inner and outer channels, and a relief valve located in said by-pass passage and arranged to open from the common delivery channel to the common inlet channel upon excessive delivery pressure.

4. A pump comprising a body, a rotatable driving shaft extending through and journalled within a central opening in the body, an eccentric piston driving means on one projecting end of the shaft, a plurality of individually formed substantially radial cylinders detachably secured to and projecting laterally from the respective end of the body, the said cylinders being arranged at substantially equal angular spacings about the said piston driving means, a reciprocable piston in each cylinder, a piston actuating means extending inwardly from each piston for operative engagement with the piston driving means, the body being formed internally with two channels which extend substantially concentrically about the shaft, in lateral opposition to the several cylinders, the channels being disposed substantially in the same transverse plane and one inwardly of the other, the inner channel being spaced from the said central opening in the body whereby liquid cannot pass inwardly therefrom and into contact with the shaft, one of the said channels being a common inlet channel which communicates with a common supply passage in the body, the other channel being a common delivery channel which communicates with a common discharge passage in the body, the outer end portion of each cylinder being connected through an individual laterally extending inlet passage to the common inlet channel and being connected through an individual laterally extending delivery passage to the common delivery channel, an inlet valve in each inlet passage, a delivery valve in each delivery passage, the body being formed with a substantially radially disposed by-pass passage extending between and connecting the inner and outer channels and a relief valve associated with the by-pass passage to permit liquid to pass from the common delivery channel to the common inlet channel when the delivery pressure exceeds a predetermined value.

5. A pump comprising a body, a driving shaft journalled centrally in the body and projecting from both ends thereof, a piston driving means on one projecting end of the shaft, a plurality of individually formed cylinders detachably secured at substantially equal angular spacings to the respective end of the body whereby they are arranged substantially radially about the said piston driving means, the said cylinders being arranged in diametrically opposed pairs, a reciprocable piston in each cylinder, a piston actuating means connecting each diametrically opposed pair of pistons and coacting with the intervening piston driving means, the said body being formed with two spaced internal channels which extend substantially concentrically around the shaft and are disposed in lateral opposition to the several cylinders, the said channels being disposed substantially in a common transverse plane and one inwardly of the other, the inner channel being spaced from the inner periphery of the body so that liquid cannot pass inwardly therefrom and into contact with the shaft, one of the said channels being a common inlet channel which communicates with a common supply passage extending substantially radially outwards therefrom, the other channel being a common delivery channel which communicates with a common discharge passage extending substantially radially outwards therefrom, the outer end portion of each cylinder being connected to the common inlet channel through a laterally extending inlet passage individual thereto and being also connected to the common delivery channel through an individual laterally extending delivery passage, an inlet valve in each inlet passage, a delivery valve in each delivery passage and a relief valve operable to permit liquid to pass from the delivery channel to the inlet channel when the delivery pressure exceeds a predetermined value.

References Cited in the file of this patent

UNITED STATES PATENTS

| | | |
|---|---|---|
| 139,840 | Wernick | June 10, 1873 |
| 516,840 | Robinson | Mar. 20, 1894 |
| 1,274,955 | Sundh | Aug. 6, 1918 |
| 1,409,786 | Sansbury | Mar. 14, 1922 |
| 1,466,230 | Johnson | Aug. 28, 1923 |
| 2,058,591 | Kammer | Oct. 27, 1936 |
| 2,121,120 | De Lancey | June 21, 1938 |
| 2,345,125 | Huber | Mar. 28, 1944 |
| 2,456,651 | Schmiel | Dec. 21, 1948 |
| 2,471,939 | Davis | May 31, 1949 |
| 2,522,890 | Peterson | Sept. 19, 1950 |
| 2,621,607 | Trapp | Dec. 16, 1952 |
| 2,679,808 | Thun | June 1, 1954 |

FOREIGN PATENTS

| | | |
|---|---|---|
| 178,672 | Great Britain | Apr. 27, 1922 |